(12) United States Patent
Cecchelli et al.

(10) Patent No.: US 8,607,940 B2
(45) Date of Patent: Dec. 17, 2013

(54) DRUM BRAKE

(75) Inventors: Ivan Cecchelli, Savona (IT); Marco Monopoli, Savona (IT)

(73) Assignee: Automotive Products Italia (SV) s.r.l. (IT)

( * ) Notice: Subject to any disclaimer, the term of this patent is extended or adjusted under 35 U.S.C. 154(b) by 989 days.

(21) Appl. No.: 11/918,392

(22) PCT Filed: Apr. 4, 2006

(86) PCT No.: PCT/IB2006/001032
§ 371 (c)(1),
(2), (4) Date: Oct. 12, 2007

(87) PCT Pub. No.: WO2006/109180
PCT Pub. Date: Oct. 19, 2006

(65) Prior Publication Data
US 2012/0175205 A1    Jul. 12, 2012

(30) Foreign Application Priority Data

Apr. 13, 2005 (GB) .................................. 0507470.3
Nov. 11, 2005 (GB) .................................. 0523107.1

(51) Int. Cl.
*F16D 55/08* (2006.01)

(52) U.S. Cl.
USPC ...................................... 188/72.9; 188/250 R

(58) Field of Classification Search
USPC ............... 188/74, 78, 79, 325–341, 242–249, 188/250 R, 252, 253, 258, 72.7–72.9
See application file for complete search history.

(56) References Cited

U.S. PATENT DOCUMENTS

| 1,809,411 | A | * | 6/1931 | Gunn ............................. 188/336 |
| 2,051,088 | A | * | 8/1936 | Kittle et al. ............... 188/106 A |
| 2,071,420 | A |   | 2/1937 | Napolitan |

(Continued)

FOREIGN PATENT DOCUMENTS

| DE | 1 123 526 | 2/1962 |
| GB | 468071 | 6/1937 |

OTHER PUBLICATIONS

International Search Report corresponding to application PCT/IB2006/001032 dated Aug. 25, 2006.

*Primary Examiner* — Christopher Schwartz
(74) *Attorney, Agent, or Firm* — RatnerPrestia

(57) ABSTRACT

A brake has a pair of brake pads (12), each pad being moveable generally radially outwardly into contact with a brake drum by a respective operating lever (14) acted on at one end by a brake applying means (15) and pivoted (16) at the other end from a backplate (11). Each pad is contacted by a portion (14c) of the respective operating lever intermediate the lever ends and moving radially outwardly between a pair of circumferentially spaced abutments (45) which extend generally perpendicular to the backplate and which react braking torque when the brake is applied. One end of each abutment (45) is supported from the backplate and the other free ends of the abutments is linked circumferentially (46) to each other to brace the pair of abutments against relative circumferential deflection when the brake is applied. The pivots (16) of the levers may also be connected by a bracing link (75) to help to control the deflection of the pivots when the brake is applied.

26 Claims, 10 Drawing Sheets

(56) References Cited

U.S. PATENT DOCUMENTS

| | | |
|---|---|---|
| 2,116,174 A | 5/1938 | Kay |
| 2,503,489 A | 4/1950 | James, Jr. |
| 3,021,923 A * | 2/1962 | Burnett ............................ 188/78 |
| 3,138,205 A * | 6/1964 | Graham et al. ............ 166/280.1 |
| 4,350,230 A * | 9/1982 | Ingram et al. ..................... 188/79 |
| 5,167,304 A * | 12/1992 | Capek ............................ 188/325 |
| 7,182,182 B2 * | 2/2007 | Dupuis ......................... 188/72.9 |
| 8,196,717 B2 * | 6/2012 | Monopoli et al. ......... 188/79.51 |
| 2003/0168297 A1 * | 9/2003 | Ikeda ............................. 188/328 |
| 2004/0262102 A1 | 12/2004 | Ota et al. |

* cited by examiner

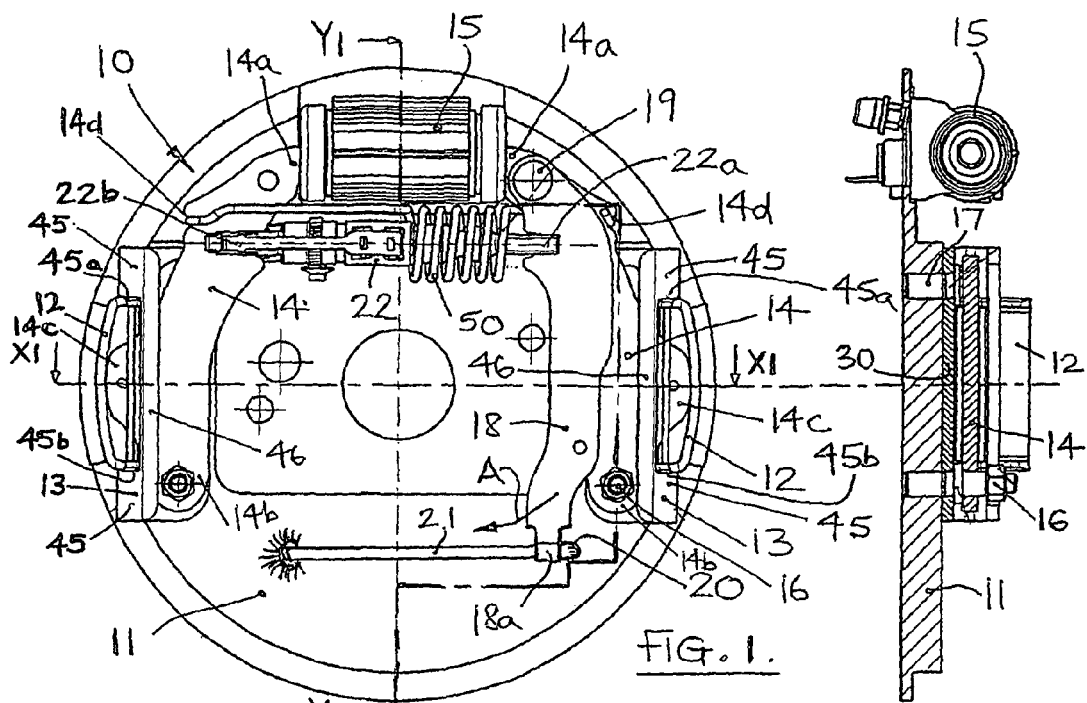
FIG. 1.
FIG. 3.
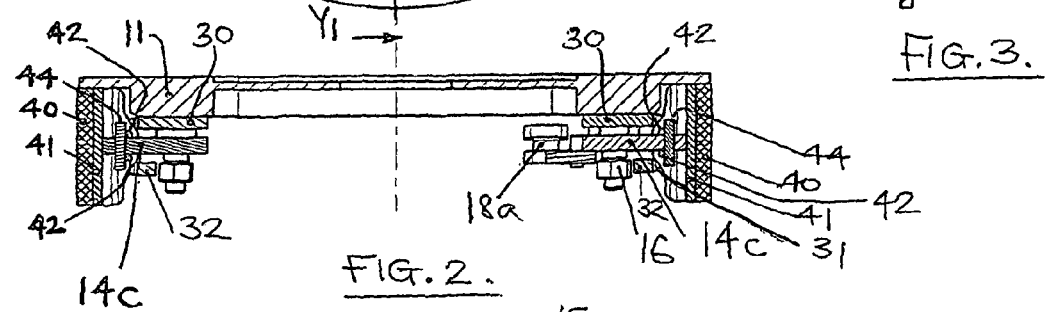
FIG. 2.
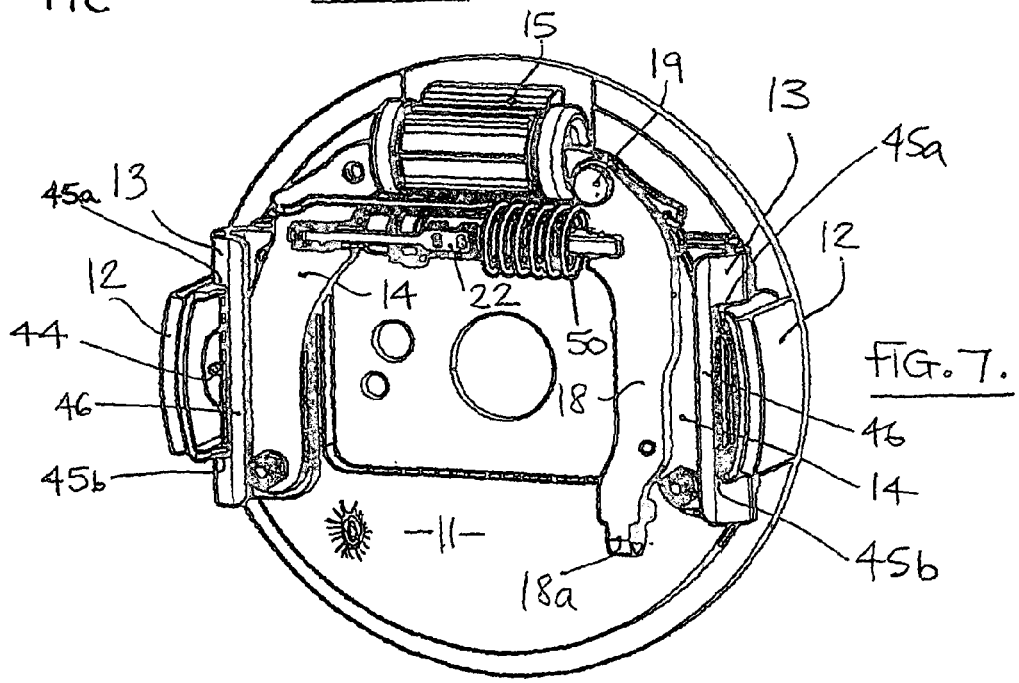
FIG. 7.

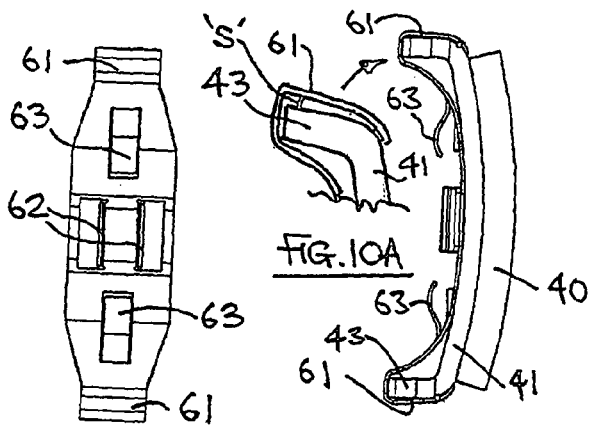
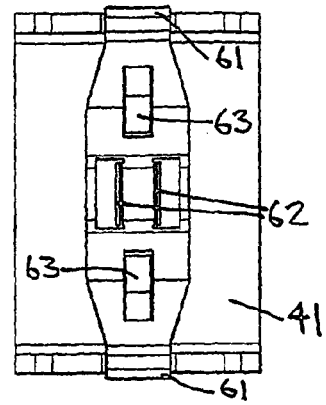
FIG. 8.   FIG. 10.   FIG. 10A.   FIG. 11.
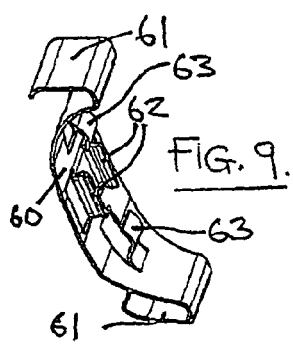
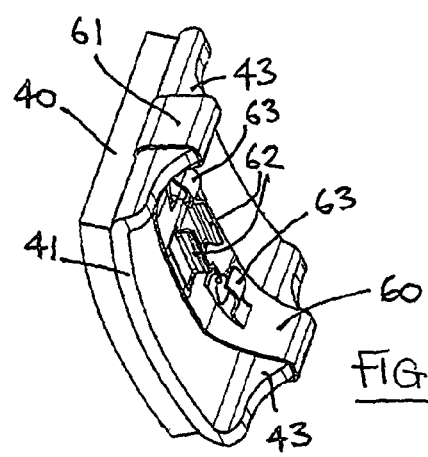
FIG. 9.   FIG. 12.
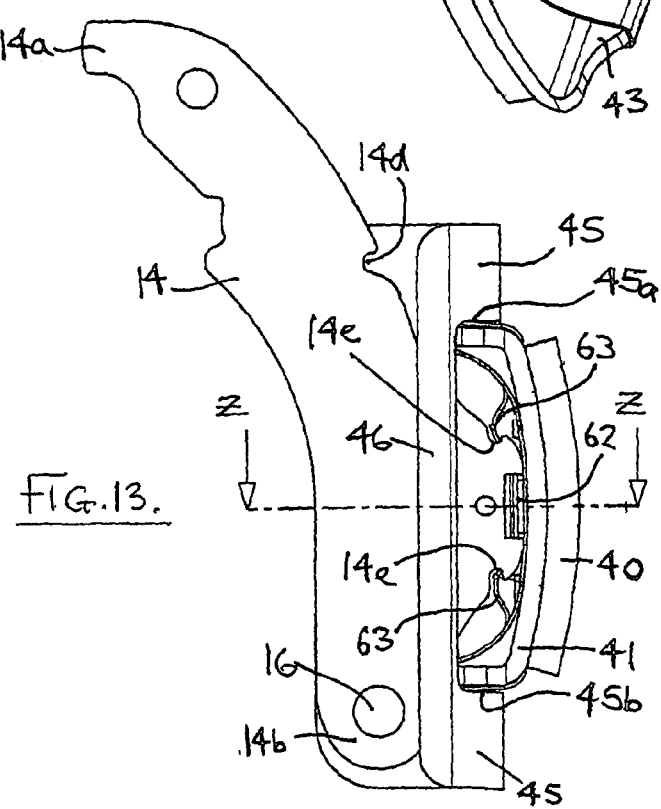
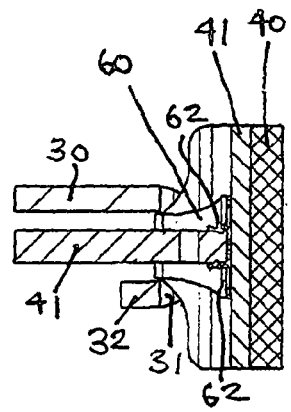
FIG. 13.   FIG. 14.

DRUM BRAKE

CROSS REFERENCE TO RELATED APPLICATIONS

This application is the U.S. National Phase Application of PCT International Application No. PCT/IB2006/001032, filed Apr. 4, 2006, which claims priority to GB 0507470.3, filed Apr. 13, 2005, and GB 0523107.1, filed Nov. 11, 2005.

FIELD OF THE INVENTION

This invention relates to drum brakes and in particular to brakes of the type in which a pair of brake pads are provided, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied.

BACKGROUND OF THE INVENTION

Such drum brakes are known and are shown, for example, in U.S. Pat. No. 2,051,088, U.S. Pat. No. 2,503,489 and U.S. Pat. No. 4,350,230.

SUMMARY OF THE INVENTION

It is an object of the present invention to provide an improved from of the brake described above.

Thus in accordance with the present invention there is provided a brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, one end of each abutment being supported from the backplate and other free ends of the abutments being linked circumferentially to each other to brace the pair of abutments against relative circumferential deflection when the brake is applied.

Preferably each pair of abutments art formed as a generally U-shaped channel structure with one side of the channel forming part of (or being attached to) the backplate, circumferentially spaced surfaces in at least the base of the U-shaped structure providing abutment surfaces for contact with the respective pad when the brake is applied, and the other side of the U-shaped structure providing the circumferential link to brace against circumferential deflection when the brake is applied.

The base of the U-shaped structure preferably has an aperture through which the portion of the lever which contacts the pad extends.

The abutment surfaces may be provided by the ends of the aperture in the base of the U-shaped structure through which the lever extends.

Alternatively the abutment surface may be provided by external edges of the U-shaped structure or the abutment surfaces may be provided intermediate external edges of the U-shaped structure and the ends of the aperture through which the lever extends.

The abutment surfaces may be extended from the base of the U-shaped structure into portions of the sides of the structure adjacent to the base to provide a greater contact area with the associated pad.

The backplate of the brake may be provided with an aperture adjacent each pad through which the pad can be inserted into or withdrawn from its operational position between the circumferentially spaced abutments. A cover plate may be provided for closing each such aperture.

In a preferred arrangement the U-shaped channel structure is separate from the backplate and the respective operating lever is pivoted on said one side of the channel.

The pivot for the operating lever may be used to secure the U-shaped channel structure to the backplate.

Each operating lever may be pivoted on the backplate by a pin which extends generally perpendicular to the backplate, the free ends of the pins remote from the backplate being connected by a bracing link which helps to control the deflection of the pins relative to the backplate when the brake is applied.

The invention also provides a brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, each lever being pivoted on the backplate by a pin which extends generally perpendicular to the backplate, the free ends of the pins remote from the backplate being connected by a bracing link which helps to control the deflection of the pins relative to the backplate when the brake is applied.

A handbrake lever may be pivoted on one of said operating levers adjacent said one end thereof and a strut may extend between said hand brake lever and said one end of the other operating member so that pivoting of the hand brake lever relative to said one operating lever moves the other operating lever towards its associated pad and thus, by reaction through the strut, also moves said one operating lever towards its associated pad thus applying the brake to provide a hand brake function.

The backplate may comprises a main strip-like structural portion on each end of which the U-shaped channel structures are formed or mounted with the bases of the channels facing away from each other, the remainder of the backplate being of a less robust form.

The brake applying means may be hydraulic or electrical.

Preferably each pad is releasably connected with its associated operating lever to limit radial movement of the pad relative to the lever.

The invention also provides a brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, each pad being connected with its associated operating lever to limit radial movement of the pad relative to the lever.

Retraction spring means are preferably provided to retract the operating levers when the brake is released thus retracting the associated pads.

Each pad may be connected with its associated operating lever by a spring clip which has first formations which grip the pad and second formations which grip a formation on the associated lever.

The spring clip may be shaped to extend between the pad and the abutments to provide a resilient contact therebetween to help to reduce pad vibration/noise.

Alternatively each pad may be connected with its associated operating lever by removable pin means which engage the lever and a formation on the pad.

In a further alternative each pad may be connected with its associated operating lever by a spring clip on the pad which has one or more projections which engage formations on one or both sides of the lever.

The invention also provides a pad for a drum brake as described in the preceeding paragraph, the pad having a clip with projections for engagement with the generally circumferentially extending formations on the associated operating lever.

BRIEF DESCRIPTION OF THE DRAWINGS

The present invention will now be described, by way of example only, with reference to the accompanying drawings in which:—

FIG. 1 shows a side view of a brake in accordance with the present invention with the drum removed;

FIG. 2 shows a section on the line X1-X1 of FIG. 1;

FIG. 3 shows a section on the line Y1-Y1 of FIG. 1;

FIG. 7 shows a perspective view of the brake shown in FIG. 1;

FIGS. 8, 9, 10, 11 and 12 show views of a spring clip used to secure a brake pad to an associated operating lever in accordance with the invention;

FIG. 13 shows, on a larger scale, details of the brake pad, abutment and operating lever arrangement of the present invention;

FIG. 14 shows a section on the line Z-Z of FIG. 13;

DETAILED DESCRIPTION OF THE PREFERRED EMBODIMENTS

Figure 4:
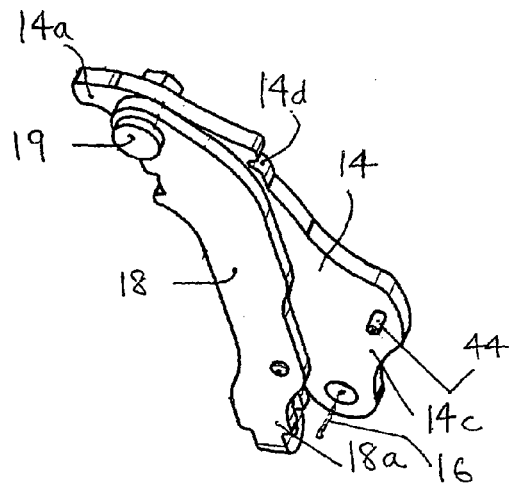
FIG. 4 shows a perspective view of a pad operating lever and associated handbrake lever which form part of the present invention.

Referring to the drawings, a brake 10 has a backplate 11 on which a pair of brake pads 12 are supported for generally radially outward movement into contact with a associated brake drum (not shown) by abutment structures 13. Each pad is moved radially outward into contact with the drum by an associated operating lever 14 which is acted on at its upper end 14a by a brake applying means in the form of a hydraulic wheel cylinder 15. The lower end 14b of each operating lever is pivoted on the associated abutment structure 13 by a pivot pin 16 which is also used together with a further rivet pin 17 to secure the abutment structure 13 to the backplate 11.

Pivoted on the right-hand operating lever 14 by a rivet 19 is a handbrake lever 18. The handbrake lever has a U-shaped lower portion 18a which engages with a nipple 20 on the end of a handbrake operating cable 21 in a conventional manner. Alternatively, any other form of connection of the hand brake operating cable to the lower end 18a of lever 18 can be employed. For example, the quick attach arrangement shown in the Applicants patent EP 917630 is suitable.

The handbrake lever 18 engages one end 22a of an automatic brake pad clearance adjusting strut 22 whose effective length is automatically adjusted as the pads 12 wear to maintain a substantially constant pad to drum clearance throughout the life of the pads. This auto adjuster may, for example, be of the form disclosed in the Applicants patent EP 388057 to which the reader is directed if further details are required. The other end 22b of strut 22 engages the left-hand operating lever 14. Thus as in well known, when lever 18 is pivoted about rivet 19 in a clockwise sense as indicated by arrow A using cable 21 lever 18 pushes on strut 22 which in turn pivots lever left-hand lever 14 its about pivot 16 to force left-hand pad 12 into contact with the associated drum. The reaction force of left-hand pad 12 contacting the shoe is transmitted to right-hand lever 14b via pivot pin 19 through strut 22 thus also forcing right-hand brake pad 12 to engage the associated drum so that a full handbrake function is generated.

In accordance with the present invention, each abutment structure 13 is formed as a generally U-shaped channel structure with one side 30 contacting the backplate 11 and the base of the channel having an aperture 31 through which a portion 14c of the respective operating lever 14 extends.

Figure 5:
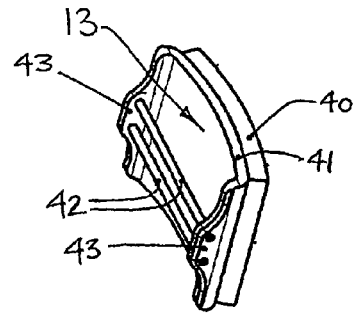
FIG. 5 shows a perspective view of a brake pad used in the present invention.
Figure 6:
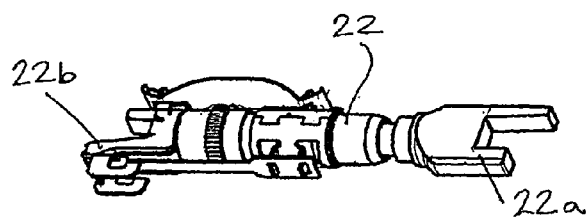
FIG. 6 shows a perspective view of an automatic disc brake clearance adjusting strut used in the present invention.

As shown in FIG. 5, each brake pad 12 comprises a friction pad 40 and a metal backing/support member 41. Each support member 41 has a pair of locating rods 42 which extend between ears 43. Locating rods 42 are used to secure pad 12 to its associated operating lever 14 using a removable roll pin 44 as best seen in FIG. 2.

The ears 43 of the pad supports 41 contact abutment surfaces 45a or 45b on the abutment structures 13 when the brake is applied depending on the direction of rotation of the drum. This contact reacts the braking torque generated. The abutment surfaces 45a and 45b are provided on abutment portions 45 of each abutment structure 13 and extend across the base of the abutment structure and into the sides of the U-shaped structure adjacent the base to provide a good balanced contact area between the pads 12 and the abutment structure 13. In accordance with the present invention these abutments portions 45 are linked circumferentially by portion 46 of the abutment structure which forms the opposite side 32 of the U-shaped channel structure. This link 46 between the abutment portions 45 braces the abutment portions against relative circumferential deflection when the brake is applied thus better resisting the braking torque generated and providing a more robust brake structure.

As can be seen from FIG. 1, a retraction spring 50 encircles the adjusting strut 22 and is engaged at opposite ends with cut-outs 14d in the operating levers 14. This retraction spring pivots the levers away from the associated brake drum when the hydraulic wheel cylinder 15 or the handbrake lever 18 is released thus retracting the operating levers and hence the associated brake pads 12 by their connection through roll pins 44.

FIGS. 8 to 14 show an alternative arrangement in which each brake pad 12 is secured to the associated lever 14 using a spring clip 60. The ends 61 of each clip are arranged to grip around the ears 43 of each pad to secure the clip to the pad. The clip has tongues 62 which extend on either side of the associated operating lever portion 14c to help locate the pad in direction at right angles to the backplate. A further pair of tongues 63 are provided on clip 60 which clip into notches 14e provided on the associated operating lever to secure the pad to the operating lever.

Also, as can be seen from FIG. 10A the end portions 61 of the spring clip are spaced a small distance S from the brake pad support member ears 43. The end portions 61 of the spring clip are arranged to contact the abutment surfaces 45a and 45b on the abutment portions 45. Thus a resilient contact is provided between the brake pads and the abutment portions as the small clearance S is closed when the brake pad is moved slightly circumferentially on contacting the associated drum. This resilient contact helps to reduce brake pad vibration/noise.

Figure 15:
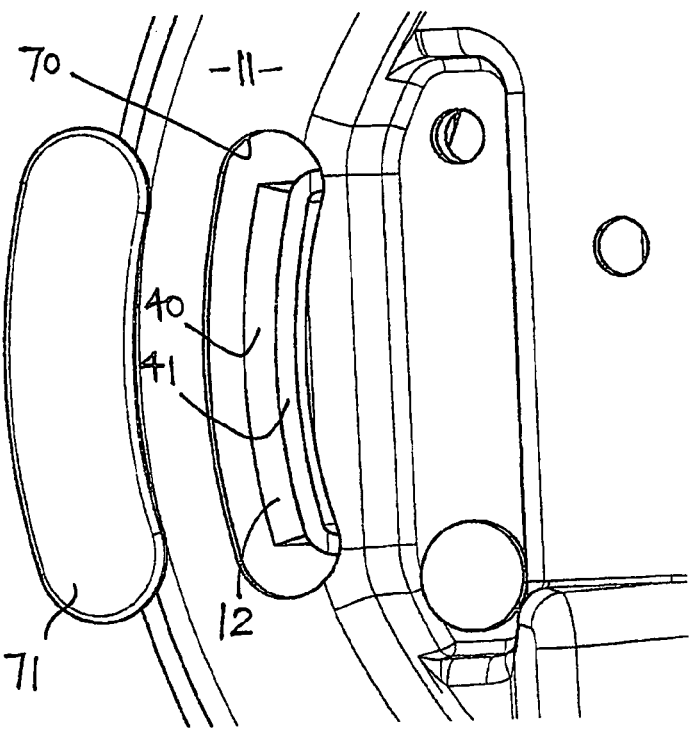
FIG. 15 shows details of an aperture in the back plate to allow easy removal of a brake pad in a brake of the present invention.

A brake in accordance with the present invention may be provided with an aperture 70 in the backplate 11 adjacent each brake pad 12 (see FIG. 15) to allow the brake pad to be removed through the backplate in the direction generally perpendicular to the backplate for servicing/replacement of the pads. Each of these apertures 70 is preferably provided with a cover 71 of plastics material which can be inserted in position in the aperture 70.

Figure 16:
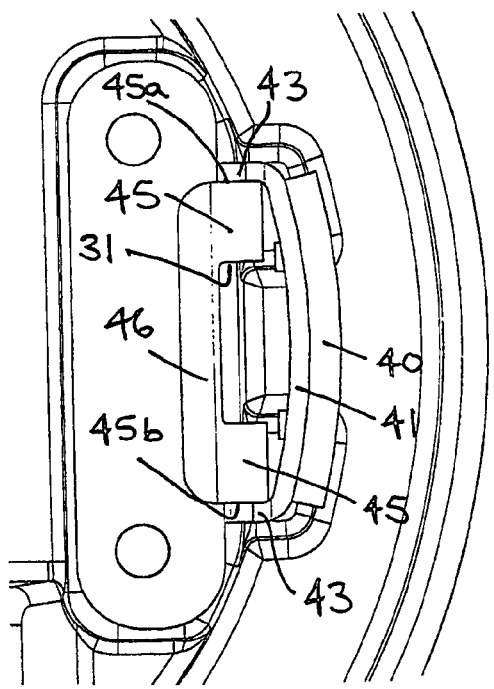
FIGS. 16 and 17 show alternative abutment arrangements for supporting a brake pad in a brake of the present invention.
Figure 17:
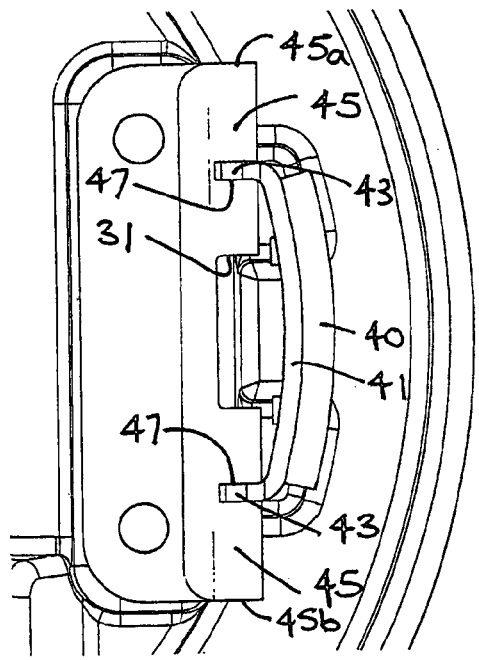

FIGS. 16 and 17 show alternative abutment structures for supporting the pads 12. In FIG. 16, the ears 43 of the pads are supported on external abutment surfaces 45a and 45b of the abutment portions 45 of the structure and these abutment portions 45 are again linked by portion 46 of the structure to resist displacements of the abutment portions when the braking torque is reacted.

In the FIG. 17 construction the ears 43 of the brake pads 12 are received in slots 47 of the abutment structure which are located in the abutment portions 45 intermediate the slot 31 through which the lever portions 14c extend and the external surfaces 45a, 45b of the abutment portions.

Figure 18:
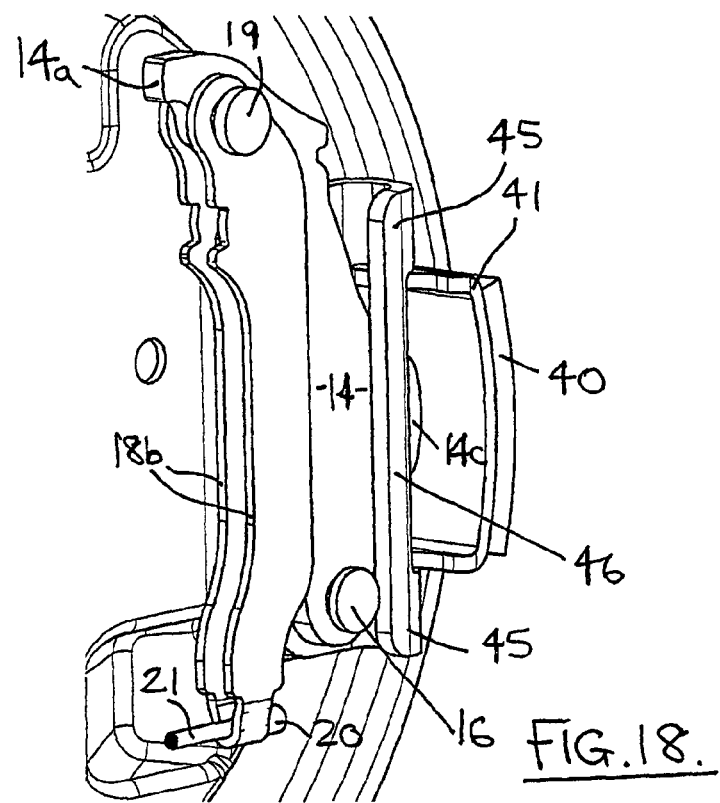
FIG. 18 shows a dual-limb type handbrake lever used in a brake in accordance with the present invention.

FIG. 18 shows an alternative handbrake lever which is of the dual-limb type in which the respective limbs 18b the handbrake lever extend on each side of the associated operating lever 14. The cable 21 and associated cable nipple 20 engaging between the limbs 18b as shown. Again, if required, any suitable form of the quick attach cable arrangement can be used such as that disclosed in the Applicants previously referred to patent EP 917630.

Figure 19:
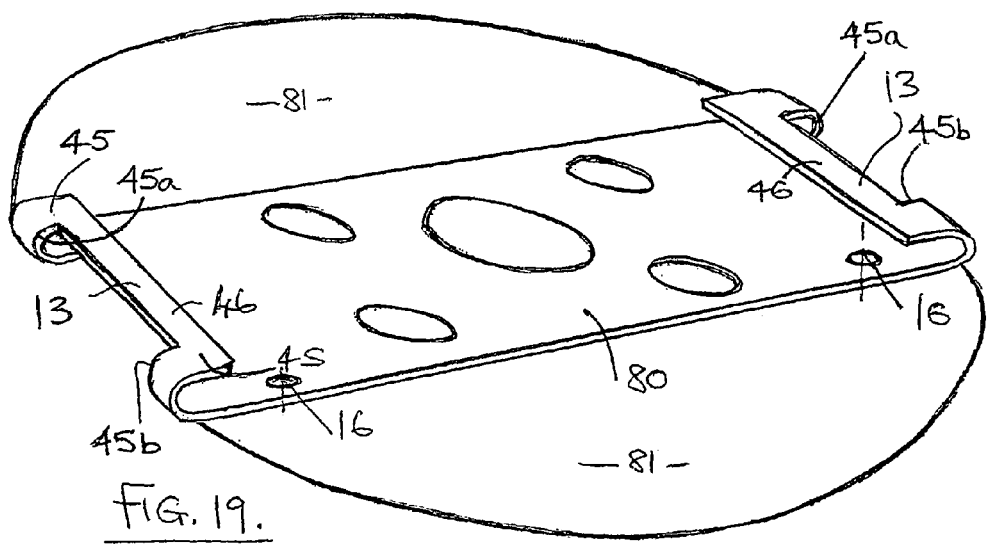
FIG. 19 shows diagrammatically an alternative backplate arrangement for a brake in accordance in the present invention.

FIG. 19 shows in diagrammatic form an alternative backplate arrangement in which the backplate comprises a main strip-like structural portion 80 on each end of which an abutment structure 13 is formed or secured with the bases of the U-shaped abutment structures facing away from each other. The remaining portion 81 of the backplate can be formed from a significantly thinner and less robust material since it is not required to resist the braking torque which is taken by the main strip-like structural support 80.

The present invention also provides a drum brake of the form shown in FIGS. 20 to 27 which is generally similar to the brake of FIG. 1 and in which similar reference numerals have therefore been used for the same or similar parts. In this arrangement the pins 16 which pivotally mount the levers 14 on the backplate are connected by a bracing link 75 which extends between the free ends 16a of the pins 16 to help to control the deflection of the pins 16 relative to the backplate when the brake us applied. The bracing link 75 is curved to increase the clearance around the hub of the associated wheel. In certain installation there may be sufficient space for link 75 to be straight in form.

Figure 23:
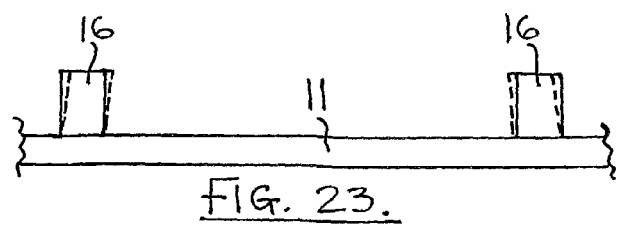
FIG. 23 shows in diagrammatic form the deflection of the lever pivots in a brake which does not have the bracing link of FIGS. 20 to 22.
Figure 24:
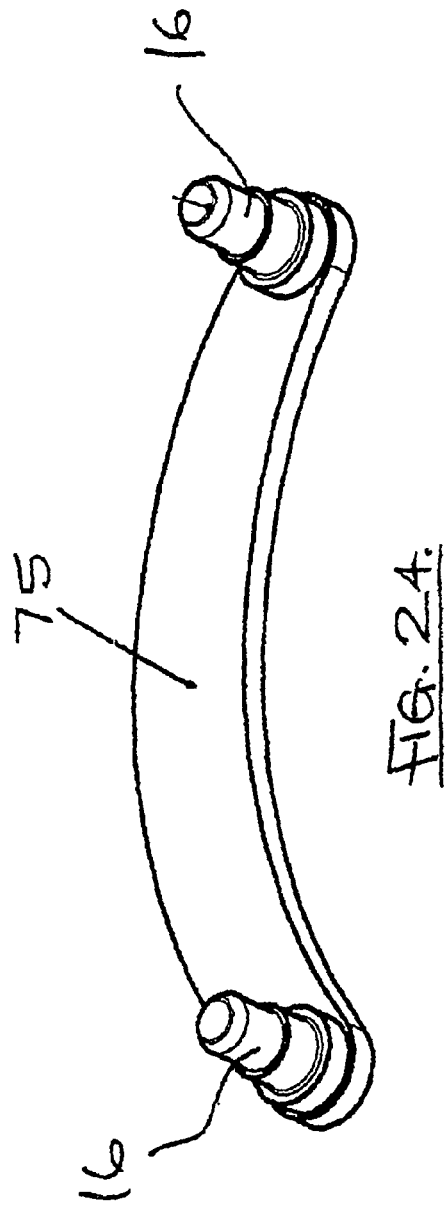
FIG. 24 shows the bracing link used in FIGS. 20 to 22.

FIG. 23 shows diagrammatically the tendency of the free ends 16a of the pins 16 to deflect towards each other when the brake is applied (shown in dotted detail). By providing the bracing link 75 this tendency is significantly reduced and thus the stiffness of the brake is greatly improved. This significantly improves the response of the brake since the loss of actuating displacement which occurs (as a result of the deflection of pins 16) if the bracing link 75 is not used is reduced. Also the reduction of the deflection of the mounting pins 16 relative to the backplate 11 helps to reduce the likelihood of any failure of the mounting of the pins on the backplate. The improved stiffness of the brake also allows the thickness of the backplate to be reduced (e.g. from 2.5 mm to 2.0 mm) this significantly reduces the material costs of the brake.

Figure 25:
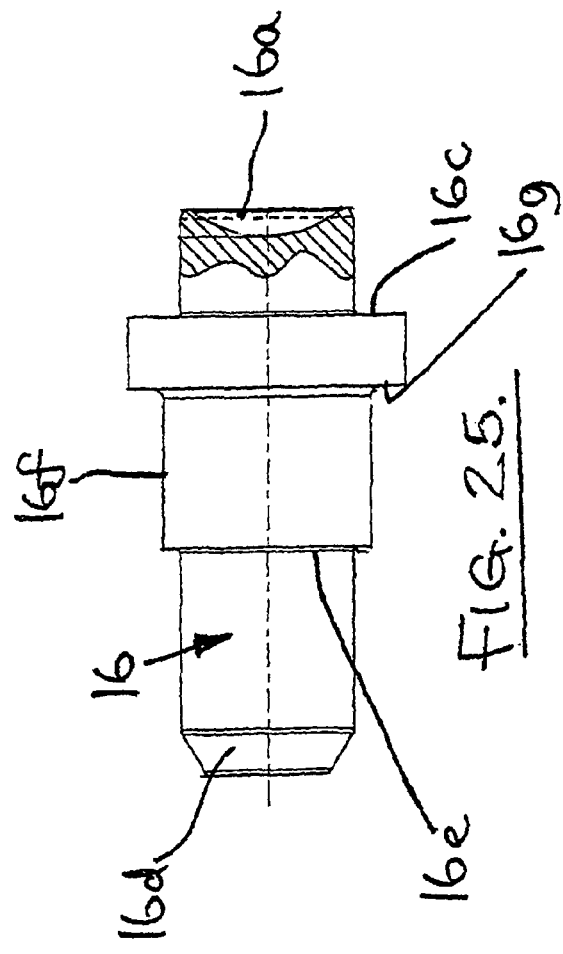
FIG. 25 shows details of the operating lever pivot pins of a brake of FIGS. 20 to 22.

FIG. 25 shows the detail of one of the pins 16. The free end 16a of the pin is riveted over at 16b (see FIG. 21) to secure the bracing link 75 against a first shoulder 16c on each pin. When the brake is assembled the other end of each pin 16 is riveted against backplate 11 at 16d to sandwich the side 30 of each abutment structure 13 between the backplate and a second shoulder 16e on each pin. Lever 14 is pivoted on portion 16f of each pin between a spacing washer 51 and a third shoulder 16g of each pin.

Figure 26:
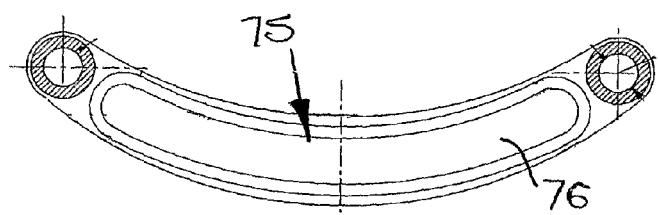
FIGS. 26 and 27 show details of an alternative pressed metal bracing link.
Figure 27:
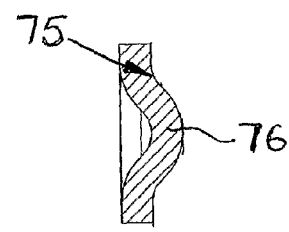

FIGS. 26 and 27 show an alternative form of bracing link 75 which is formed by pressing and which includes a longitudinally extending stiffening formation in the form of a pressed ridge 76.

Figure 28:
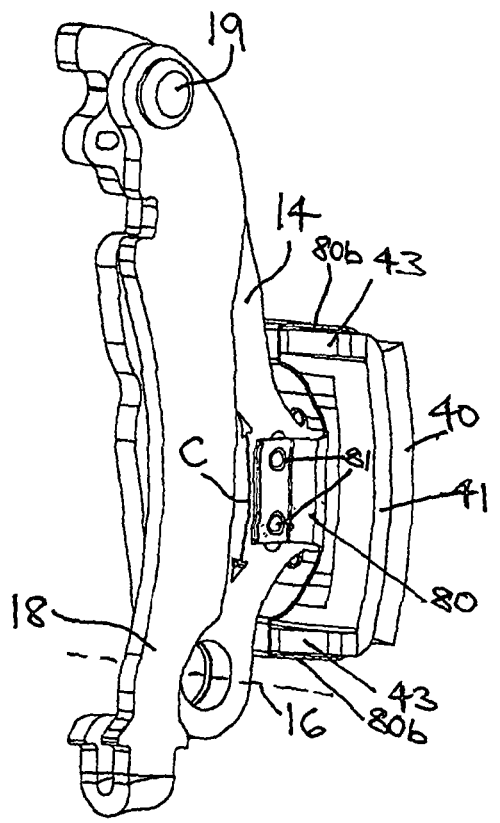
FIGS. 28 to 30 show details of an alternative clip arrangement for securing a brake pad to an associated operating lever.
Figure 30:
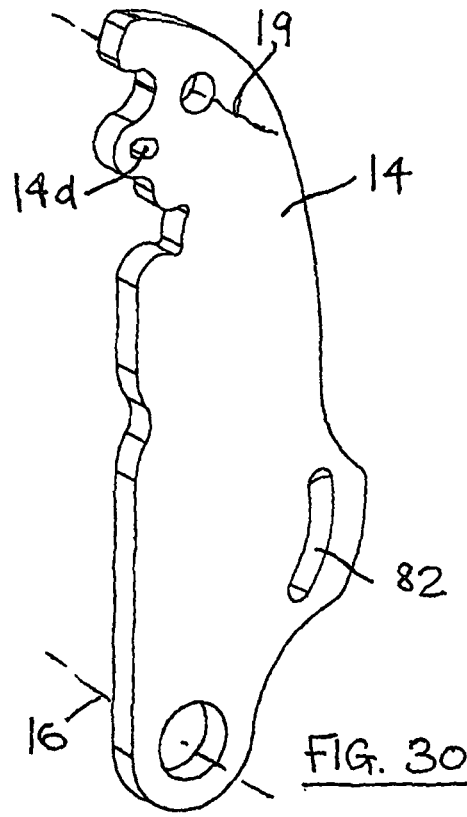
Figure 29:
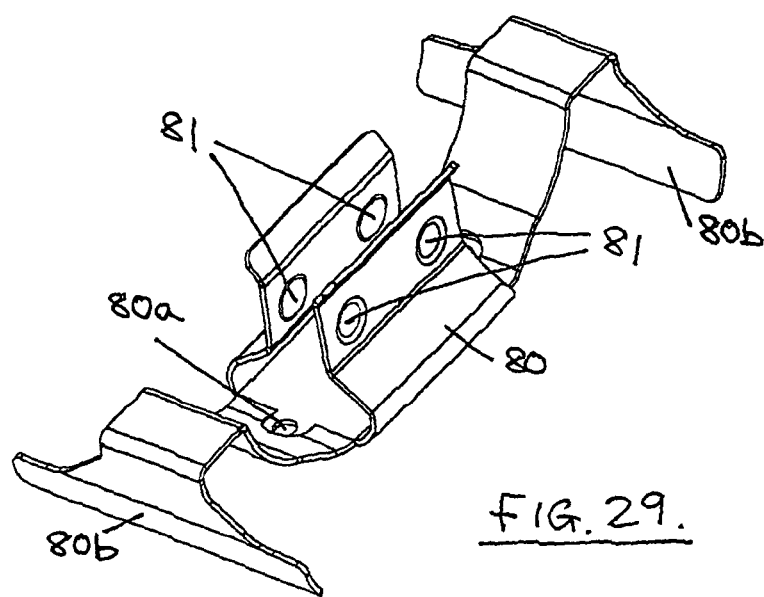

FIGS. 28 to 30 show an alternative construction for securing brake pads 12 to their associated lever 14 using spring clips 80 which are riveted (via holes 80a) or otherwise secured to the back of the brake pads 12. Clips 80 include two or more projections 81 which extend into generally circumferentially extending slots or grooves 82 provided in both sides of each lever 14. In the arrangement shown four such projections are used but only two projections may be used, one on each side of lever 14. Alternatively, only one projection may be used which engages only one slot on one side of lever 14. The pads are thus held onto the levers 14 but are able to move to a limited extent circumferentially relative to the levers (see arrow C in FIG. 28) under braking to occupy the best position relative to lever to ensure good contact between the pad and the associated drum throughout the working life of the pad.

In the arrangement shown in FIGS. 28 to 30 the clips 80 are also extended at 80b (in a manner similar to the portions 61 of the clip 60 of FIGS. 8 to 14) to clip around the ears 43 of the pad to provide resilient contact between the pads and the abutment surfaces 45a and 45b to reduce pad vibration/noise.

Figure 31:
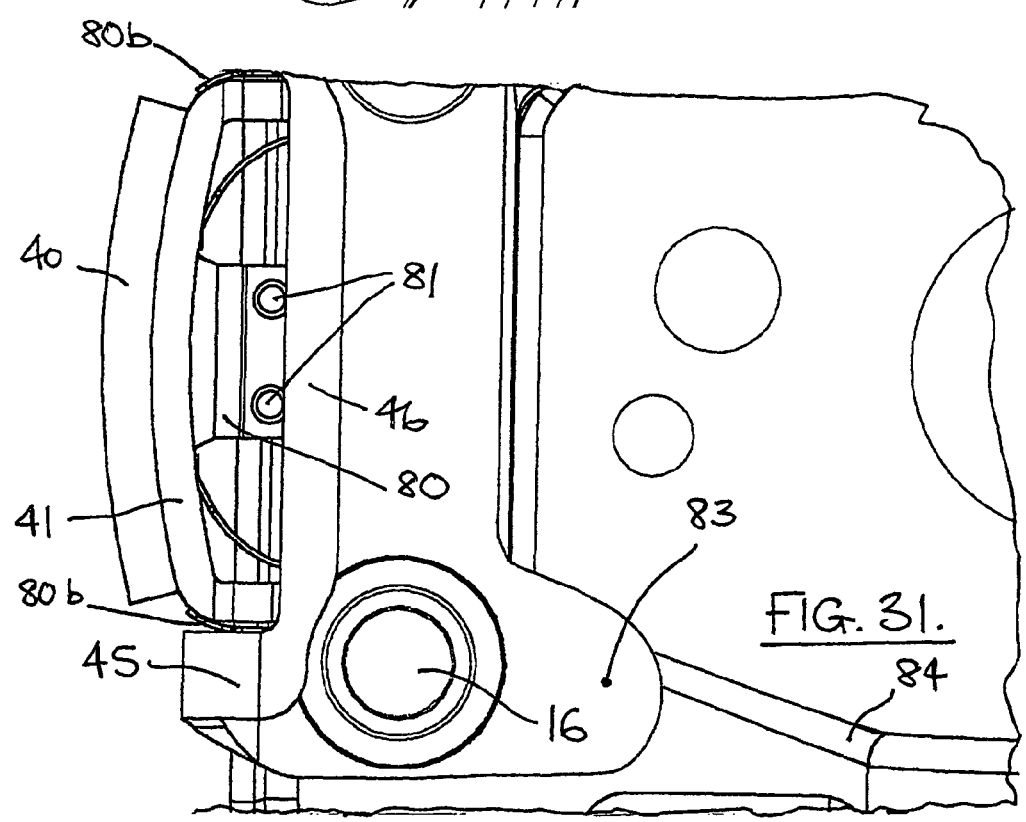
FIG. 31 shows an alternative extended foot portion provided on a pad support structure of a brake in accordance with the present invention.
Figure 20:
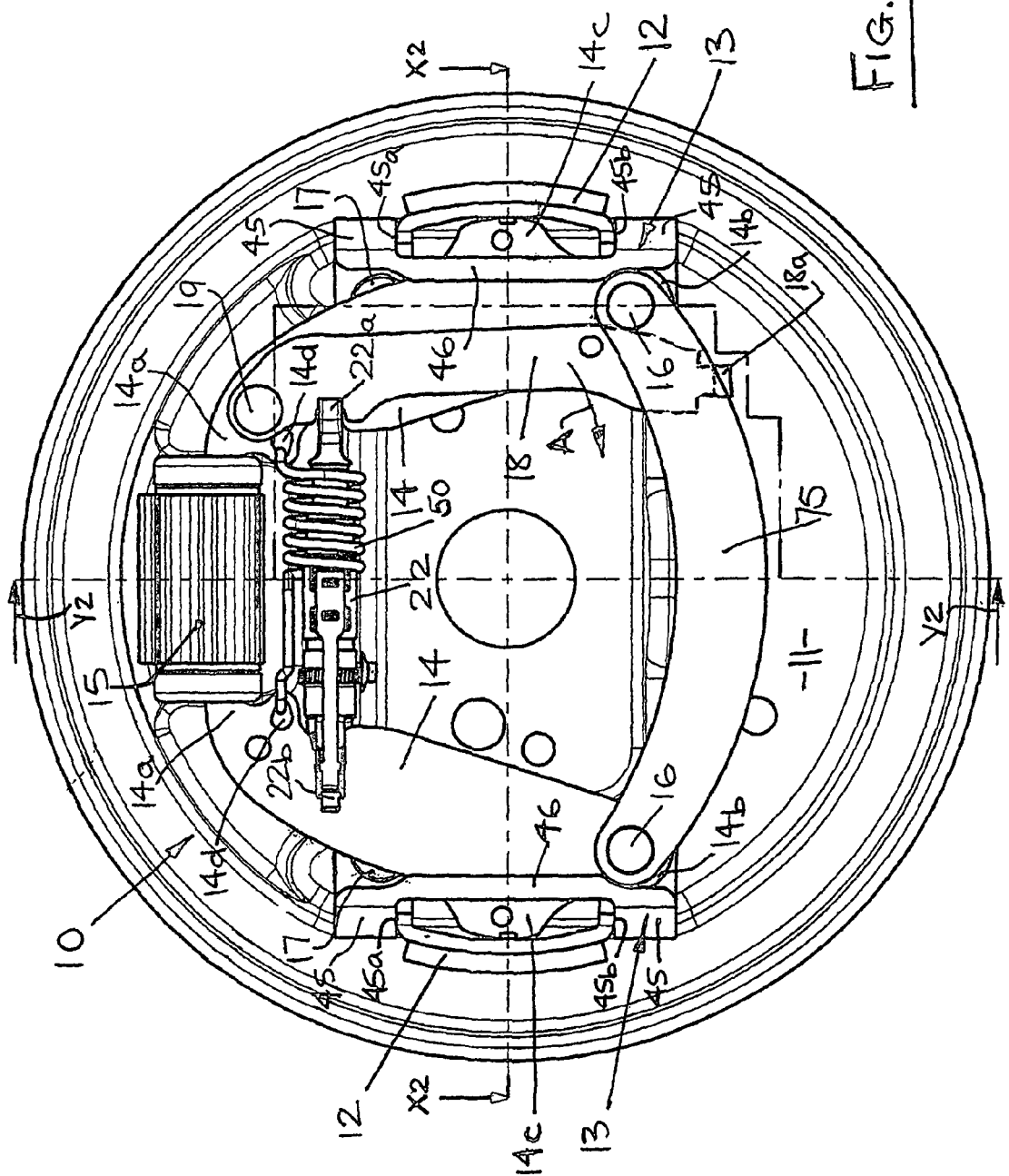
FIG. 20 shows a side view of a further form of brake in accordance with the present invention with the drum removed.
Figure 21:
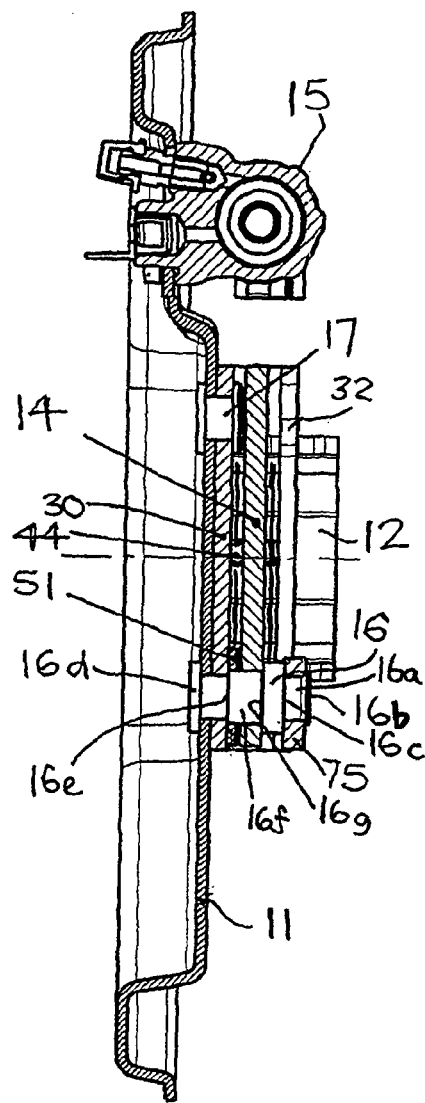
FIG. 21 shows a section on the line X2-X2 of FIG. 20.
Figure 22:
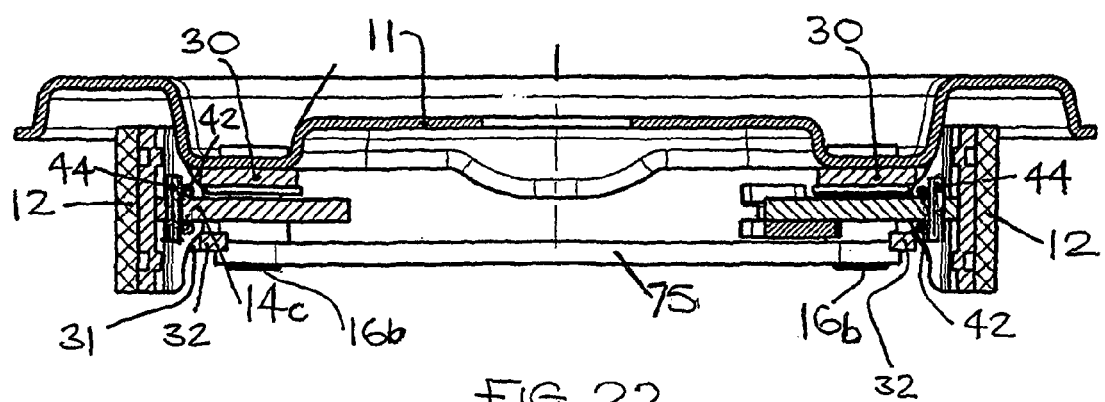
FIG. 22 shows a section on the line Y2-Y2 of FIG. 20.

FIG. 31 shows a further modification to the brake previously described in which the U-shaped abutment 13 has an extended foot portion 83 which extends towards a similar extended foot portion 83 on the other abutment 13 and provides better support for the adjacent pivot pin 16 which is welded or otherwise secured to the abutment 13. This increased footprint for the abutment 13 in conjunction with a transverse wall 84 pressed into the dished backplate 11 significantly improves the stiffness of the mounting of the pins 16 and may enable the bracing link 75 to be eliminated in some applications.

The present invention thus provides a simple but efficient abutment arrangement for guiding the pads towards and away from the associated drum and for resisting the braking torque generated. The link 46 between the abutment portions 45 ensures that the deflection of the resisting abutments is minimised and the bracing link 75 further improves the response of the brake by significantly stiffening the brake.

What is claimed is:

1. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, a first end of each of the pair of abutments affixed to the backplate and second ends of each of the pair of abutments being linked circumferentially via a linking portion to brace the pair of abutments against relative circumferential deflection when the brake is applied, the linking portion comprising a rigid portion extending from the second end of one of the pair of abutments to the second end of the other of the pair of abutments, and wherein the backplate is provided with an aperture adjacent each pad through which the pad can be inserted into or withdrawn from its operational position between the circumferentially spaced abutments.

2. A brake according to claim 1 in which each pair of abutments are formed as a generally U-shaped channel structure with one side of the channel forming part of or being attached to the backplate, circumferentially spaced surfaces in at least the base of the U-shaped structure providing abutment surfaces for contact with the respective pad when the brake is applied, and the other side of the U-shaped structure providing the circumferential link to brace against circumferential deflection when the brake is applied.

3. A brake according to claim 2 in which the base of the U-shaped structure has an aperture through which the portion of the lever which contacts the pad extends.

4. A brake according to claim 3 in which the abutment surfaces are provided by the ends of the aperture in the base of the U-shaped structure through which the lever extends.

5. A brake according to claim 3 in which the abutment surfaces are provided by external edges of the U-shaped structure.

6. A brake according to claim 3 in which the abutment surfaces are provided circumferentially intermediate external edges of the U-shaped structure and the ends of the aperture through which the lever extends.

7. A brake according to claim 3 in which the abutment surfaces are extended from the base of the U-shaped structure into portions of the sides of the structure adjacent to the base to provide a greater contact area with the associated pad.

8. A brake according to claim 2 in which the U-shaped channel structure is separate from the backplate and the respective operating lever is pivoted on said one side of the channel.

9. A brake according to claim 8 in which the side of each U-shaped channel structure which is attached to the backplate includes an extended foot portion adjacent to the mount of the pivot on the channel, said foot portions extending towards each other to improve the stiffness of the mounting of the pivots.

10. A brake according to claim 9 in which the backplate is provided with a transverse pressed wall which extends between the extended foot portions to further improve the stiffness of the mounting of the pivots.

11. A brake according to claim 1 in which the brake applying means is hydraulic.

12. A brake according to claim 1 in which the brake applying means is electrical.

13. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, each lever being pivoted on the backplate by a pin which extends generally perpendicular to the backplate, a first end of each pin being affixed to the backplate, second ends of each pin being connected with each other by a bracing link which helps to control the deflection of the pins relative to the backplate when the brake is applied, the bracing link comprising a rigid portion extending from the second end of one pin to the second end of the other pin.

14. A brake according to claim 13 in which the bracing piece is provided with a Longitudinally extending stiffening formation.

15. A brake according to claim 14 in which the longitudinally extending stiffening formation is a longitudinally extending ridge pressed into the link.

16. A brake according to claim 13 in which the bracing link is curved to increase the clearance around the hub of the associated wheel.

17. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied each pad being connected with its associated operating lever to limit radial movement of the pad relative to the lever, wherein each pad is connected with its associated operating lever by removable pin means which engage the lever and a formation on the pad.

18. A brake according to claim 17 in which retraction spring means are provided to retract the operating levers when the brake is released thus retracting the associated pads.

19. A brake according to claim 18 in which the retraction spring means surrounds a strut.

20. A brake according to claim 17 in which each pad is connected with its associated operating lever by a spring clip which has first formations which grip the pad and second formations which grip a formation on the associated operating lever.

21. A brake according to claim 20 in which the spring clip is shaped to extend between the pad and the abutments to provide a resilient contact therebetween to help to reduce pad vibration/noise.

22. A brake according to claim 17 in which the formations on one or both sides of the lever comprise a slot or groove which extends generally circumferentially relative to the associated drum so that the pad can move circumferentially relative to the associated operating lever to a limited extent.

23. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, a first end of each of the pair of abutments being supported from the backplate and second ends of each of the pair of abutments being linked circumferentially to each other free end to brace the pair of abutments against relative circumferential deflection when the brake is applied,
wherein the backplate is provided with an aperture adjacent each pad through which the pad can be inserted into or withdrawn from its operational position between the circumferentially spaced abutments.

24. A brake according to claim 23 in which a removable cover plate is provided for closing each respective aperture in the backplate.

25. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, a first end of each of the pair of abutments being supported from the backplate and second ends of each of the pair of abutments being linked circumferentially to each other free end to brace the pair of abutments against relative circumferential deflection when the brake is applied,
wherein each pair of abutments are formed as a generally U-shaped channel structure with one side of the channel forming part of or being attached to the backplate, circumferentially spaced surfaces in at least the base of the U-shaped structure providing abutment surfaces for contact with the respective pad when the brake is applied, and the other side of the U-shaped structure providing the circumferential link to brace against circumferential deflection when the brake is applied,
wherein the U-shaped channel structure is separate from the backplate and the respective operating lever is pivoted on said one side of the channel, and
wherein the pivot for the operating lever is used to secure the U-shaped channel structure to the backplate.

26. A brake comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied, a first end of each of the pair of abutments being supported from the backplate and second ends of each of the pair of abutments being linked circumferentially to each other free end to brace the pair of abutments against relative circumferential deflection when the brake is applied,
wherein each operating lever is pivoted on the backplate by a pin which extends generally perpendicular to the backplate, the free ends of the pins remote from the backplate being connected by a bracing link which helps to control the deflection of the pins relative to the backplate when the brake is applied.

\* \* \* \* \*